Sept. 26, 1939.  E. BORSETTI  2,174,459
MULTIPLE CLAMP
Filed Jan. 23, 1937  2 Sheets-Sheet 1

Inventor.
Ermanno Borsetti (deceased) by
Ernegia Borsetti (Administratrix)
By: Hascock Downing & Seabold
Attys.

Sept. 26, 1939.  E. BORSETTI  2,174,459

MULTIPLE CLAMP

Filed Jan. 23, 1937  2 Sheets-Sheet 2

Patented Sept. 26, 1939

2,174,459

UNITED STATES PATENT OFFICE 2,174,459

MULTIPLE CLAMP

Ermanno Borsetti, deceased, late of Genova-Sampierdarena, Italy, by Ernegia Borsetti, sole heiress and administratrix, Ferrara, Italy, assignor to Soc. An. Rolla, Traverso & Storace, Genova-Sampierdarena, Italy, a corporation of Italy Application January 23, 1937, Serial No. 121,959½
In Italy January 24, 1936

5 Claims. (Cl. 189—36)

This invention relates to some improvements in or relating to the joints for scaffoldings or framings made out of metallic tubes. One of the objects of the invention is to provide a joint by means of which it is possible to fasten together at least three tubes, one of which at least extends from both ends of the joint, while the other two are hinged or otherwise pivoted to the element in which the first named tube is clamped.

Another object of the invention is to provide means for fastening the tubular uprights and struts of the scaffolding, so as to form together a number of angles, in order to permit of forming or erecting scaffoldings or other metallic framings comprising not only vertical and horizontal members, but also diagonal struts and bracings, and this by utilizing the tubes available in stock, of standard lengths, the eventual differences of length being compensated by suitable angular adjustments.

The invention substantially consists in the different means employed for joining or combining together three simple joints, each of which is constituted of two sleeve halves or sections adapted to be connected and clamped together by suitable means, as well as in the means for hinging to a relatively fixed section or cradle of one of these single sleeve joints two like sections or cradles of other sleeve joints.

The invention further consists in the different combination of parts and especially in the manner of joining the three joint cradles together, as well as in the means for connecting the relatively movable sleeve sections or covers to said cradles and of clamping the said joint sections together and on the frame members inserted between the cradles and covers.

Multiple joints for connecting together three or more tubes of metallic scaffoldings are known, but these known constructions either do not permit of angularly adjusting two or three tubes connected together, or also they are constructed in such a manner, and for instance of light steel plates, connected together by usual or special hinge members, as not to permit of erecting solid scaffoldings or framings adapted to withstand heavy loads.

The joints according to the invention are made of rigid cast iron or steel and are designed in such a manner as to withstand any desired usual stress as of scaffoldings or semi-permanent or permanent structure framings.

The invention will be better understood by the following specification and by reference to the annexed drawings, in which.

Figure 1:
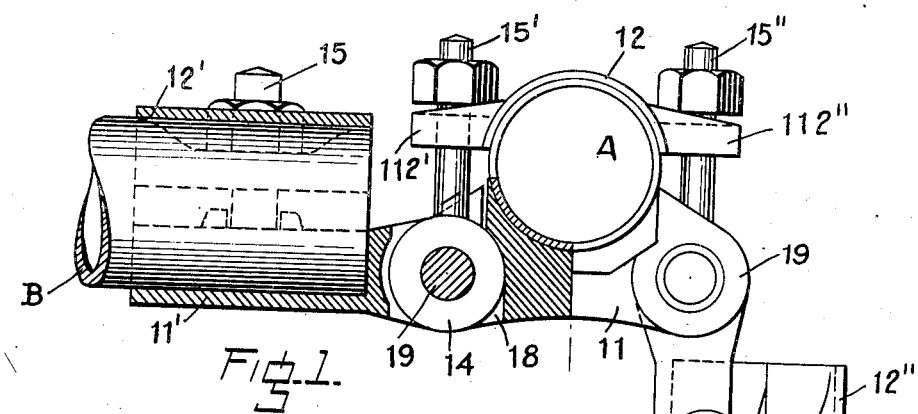
Figures 1 and 2 are a side view partly in section and a bottom view of a joint for three tubes, two of which are adapted to be angularly displaced in a plane at right angles to the other tube.
Figure 2:
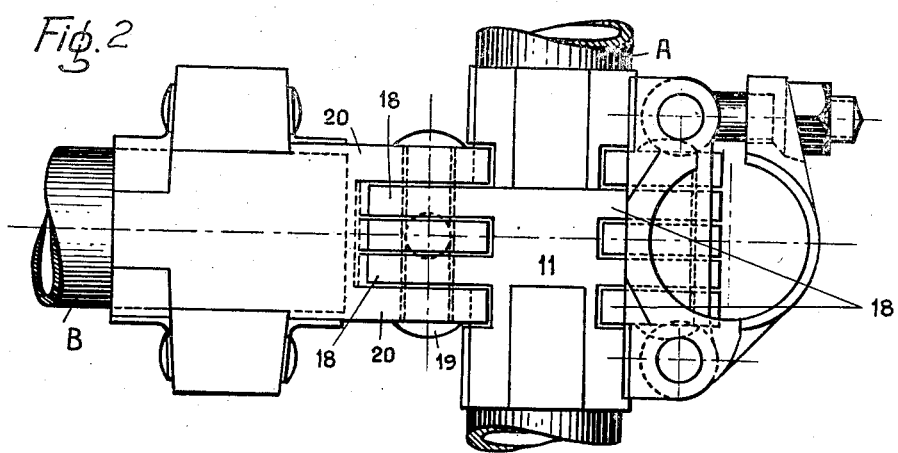

According to the embodiment shown in Figures 1 and 2, at the sides of cradle 11 of the main joint for tube A projecting on both sides of the joint, two projecting hinge eyes 13 are provided, to which two cradles 11', 11" of the joints for tubes B and C are hinged by one of their ends, that is provided with hinge eyes 20, the connection being effected by pivots 19. These pivots pass at the same time through eyes 14 of the eyebolts 15', 15", which are similar to bolts 15, but with a longer stem. Cover 12 is provided with two ears 112', 112", one of which may be provided with a bore and the other 112", with a traversing slot. Bolt 15" thus acts as hinge joint for the cover 12, while the bolt 15' may be swung towards or away from the corresponding ear 112' of the cover 12 when corresponding nut is loosened.

The tubes B and C are clamped between the cradles 11' and 11" and the respective covers 12' and 12" in a manner similar to the clamping of the tube A by means of the bolts 15.

This joint permits of the side tubes being swung to the desired angle in a plane at right angles to the axis of main tube A.

Figure 3:
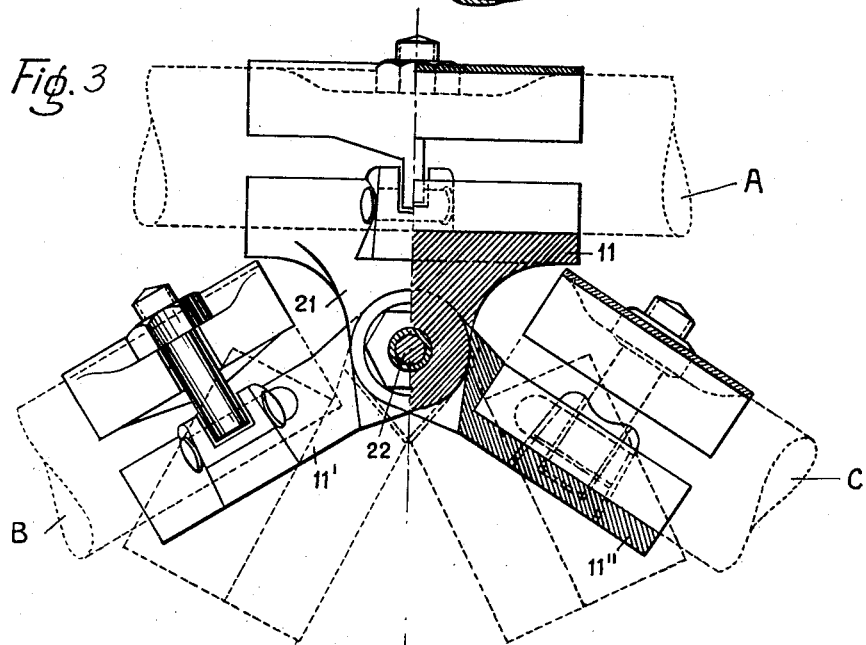
Figures 3 and 4 are respectively a side and a bottom view, partly in section, of a triple joint adapted to connect three tubes so as to permit of angularly shifting two of these tubes on the same plane of the other tube.
Figure 4:
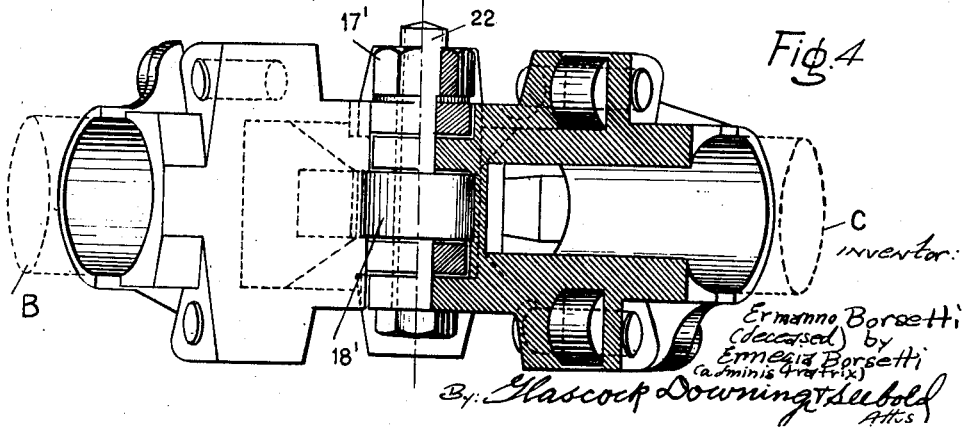

In the embodiment as shown in Figures 3 and 4 the joint for the main tube A has its cradle 11 provided with a single bracket-like projection 18' to which the cradles 11', 11" for the tubes B and C are hinged by means of a single pivot 22. The hinge eyes of the cradles 11', 11" may be intermeshing and the pivot 22 may be a bolt, as shown, so as to permit of fastening the side joints at any desired angle, for adjustment purposes, by tightening nut 17'. This fastening arrangement applies also to the embodiments shown in Figures 1 and 2, provided the hinge eyes are arranged like those shown in Figures 3 and 4. The means for attaching and clamping the covers may be the same as in the embodiment previously described.

Figure 5:
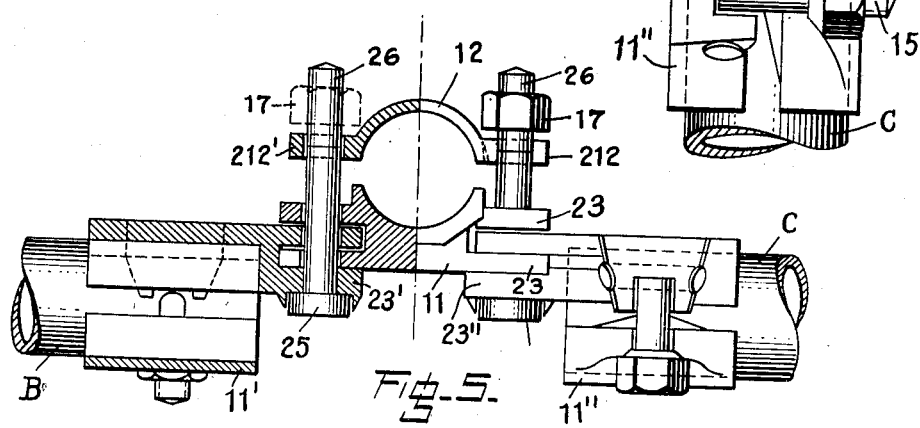
Figures 5 and 6 are respectively a side view partly in section and a bottom view of a triple joint, permitting of angularly shifting two of the tubes in a plane parallel to the axis of the other tube.
Figure 6:
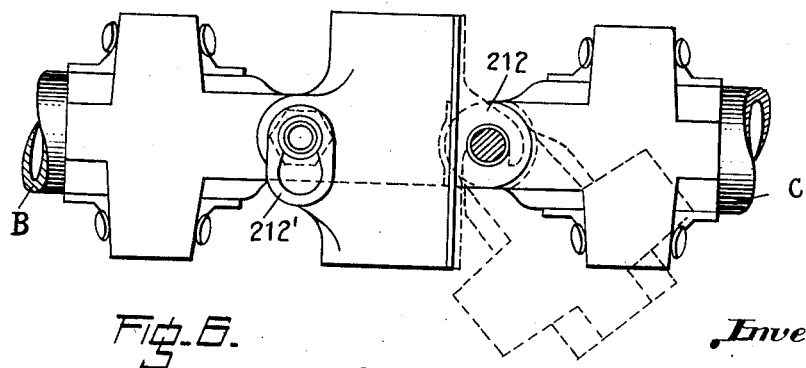

Figures 5 and 6 show another embodiment of a multiple joint comprising a cradle 11 for the main joint having hinge eyes 23 arranged in planes parallel to the axis of main tube A, with which like hinge eyes 23', 23'' of cradles 11', 11'' are pivotally connected as by bolts 26. These bolts serve also for holding the cover 12 which has a hook-shaped ear 212 and an ear 212' provided with an oval shaped slot. It is apparent that upon loosening of the nuts 17 of the bolts 26, cover 12 may be swung in a plane substantially parallel to the axis of tube A. The heads 25 of the bolts 26 may be square and fitted in corresponding recesses formed outside of hinge eyes of cradles 11', 11''. The side joints may be formed substantially like those already described by reference to Figures 1 and 2.

Of course the forms of joints as described and shown are only some of the possible designs of joints within the scope of the invention, which is not limited to the cases of three joints connected together either at predetermined fixed angles or to the case of a hinge attachment of two joints to the joint for the main or traversing tube: Thus it will be also possible to have two joints at fixed angles and one hinged, so as to permit of turning the corresponding frame member under variable angles, furthermore supplemental means can be supplied in order to register and fix the hinged joints to desired angles, and so on.

What is claimed is:

1. A triple joint for metallic scaffold frames consisting of three sleeve joints each formed by a two-section sleeve comprising, a relatively fixed half sleeve and a cover pivotally connected thereto at one of its sides and two of the half sleeves being pivotally connected to the third half sleeve independently of their covers and in such a manner as to lie out of the path of the axis of the third half sleeve and to be swung at any desired angle together with their covers, each pivotal connection between the half sleeves being effected by rigid extensions of the sleeves joined by a pivot pin, and means provided on each half sleeve for clamping the free side of said covers against the free sides of the respective half sleeves.

2. A triple joint according to claim 1 in which the two side half sleeves are hinged to the third sleeve in such a manner as to allow their swinging in a plane that is parallel to the axis of the third joint.

3. A triple joint according to claim 1 in which the side joint half sleeves are hinged to the sleeve of the third joint in such a manner as to allow their swinging in a plane at right angles to the axis of the third joint.

4. A multiple joint according to claim 1, in which the sleeves of said auxiliary sleeve joints are provided at one end with hinge eyes and the sleeve for the main joint is provided at its center portion with a projecting hinge eye, the sleeves for the auxiliary joints being hinged to the sleeve for the main joint by means of a single hinge pivot passing through all of said hinge eyes of said sleeves.

5. A sleeve joint according to claim 1, in which at least two of the three half sleeves forming each of the joints are made by hinging a cover-like sleeve section at one side of the corresponding half sleeve and by providing at the other side hinge eyes coacting with the eye of an eyebolt, said eyebolt being connected to the half sleeve by means of a single hinge pivot traversing the bolt and the hinge eyes of the half sleeve, the cover of each joint being provided at its side facing the eyebolt side of the half sleeve with a slotted ear coacting with the eyebolt to clamp the cover.

ERNEGIA BORSETTI,
*Sole Heiress and Administratrix of the Estate of Ermanno Borsetti, Deceased.*